July 20, 1948.  B. N. ASHTON  2,445,505
VALVE
Filed Sept. 30, 1943
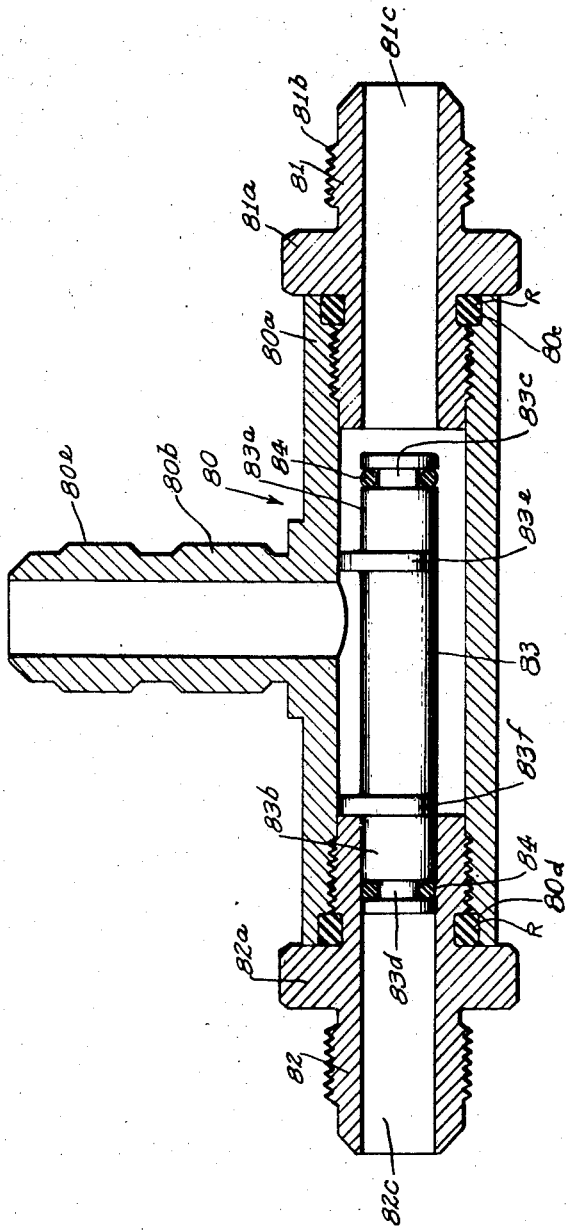
INVENTOR.
BENJAMIN N. ASHTON
BY
Hoguet, Neary & Campbell
his ATTORNEYS Patented July 20, 1948

2,445,505

UNITED STATES PATENT OFFICE 2,445,505

VALVE

Benjamin N. Ashton, Kingston, N. Y., assignor to Electrol Incorporated, Kingston, N. Y., a corporation of Delaware Application September 30, 1943, Serial No. 504,409

3 Claims. (Cl. 251—118)

1

This invention relates to improvements in valves, and particularly to valves suitable for use in high pressure hydraulic systems such as, for example, those used in operating the landing gear, wing flaps and other movable elements of airplanes.

Valves of the type heretofore found most suitable for use with high pressure fluids have required precision grinding, machining and honing in order to assure accurate seating of the valve or valve plug and to avoid leakage past the valve. Such precision operations are expensive and time-consuming and, for that reason, the cost and time involved in the production of such valves are very high.

The present invention has as an object the provision of a valve that is suitable for use in both low and high pressure hydraulic systems and can be produced with a minimum of precision machining, grinding and honing.

Another object of the invention is to provide a valve construction having a wide variety of applications that assures perfect sealing between the valve plug and the seat for the plug, without requiring a precision fit between these parts.

Valves of the type embodying the present invention are characterized by the inclusion of a deformable sealing member formed of natural or synthetic rubber or other rubbery material cooperating with the valve plug and a wall concentric with the plug to effect a seal therebetween. The sealing member preferably is in the form of a toroidal ring that is mounted loosely in a peripheral groove in the valve plug and is of sufficiently great diameter to engage the wall forming the seat for the valve as well as the bottom of the groove. The plug and the wall need not be machined or ground to close tolerances, inasmuch as the deformable ring compensates for small departures from a precision fit by moving into sealing engagement with the plug and the wall, in response to the pressure of the fluid in the system.

A particular advantage of valves of the type embodying the present invention is that an increase in the pressure of the hydraulic fluid has a tendency to compress the sealing ring more tightly into engagement with the valve plug and its seat and, as a result, any tendency of the valve to leak, due to increased pressure, is overcome.

Valves of the type embodying the invention are particularly suitable for automatic control valves that are responsive to pressure differentials to cause a change in the direction of flow of the

2 liquid or the selective flow of liquid from one or more different sources.

For a better understanding of the present invention, reference may be had to the accompanying drawings, in which the single figure is a view in longitudinal section of a pressure responsive shuttle valve embodying the present invention.

In some fluid pressure systems, two sources of pressure are provided for supplying a common system. For example, in aircraft, a supplemental gas bottle is provided to supply pressure for actuating landing flaps, landing gear, bomb bay doors and the like in the event that the source of hydraulic pressure is damaged. In such systems, it is highly desirable to have a valve which will automatically connect the hydraulic system to the gas bottle in the event that the source of hydraulic pressure is damaged or rendered ineffective. The sealing means of the present invention has proven particularly satisfactory in valves of this type and makes possible the production of substantially fool-proof and highly effective shuttle types of valves for the above-described purposes without the necessity of manufacturing the valve to extremely close tolerances.

The drawing illustrates one form of shuttle or pressure responsive valve for use in a system of the type described generally above.

This valve includes a T-shaped casing 80 having a generally cylindrical hollow body 80a and a coupling 80b at substantially its mid-portion. The opposite ends of the body 80a are internally threaded for receiving the externally threaded end couplings 81 and 82.

The couplings 81 and 82 may be provided with nut portions 81a and 82a which abut the ends of the body portion 81a and are sealed thereto by the rubber sealing rings R disposed in the recesses 80c and 80d in the ends of the casing.

The couplings 80b, 81 and 82 are provided with threaded portions 80e, 81b and 82b to permit the valve to be connected in the hydraulic-gas system.

Each of the couplings 81 and 82 is provided with a central bore 81c or 82c forming the seats for opposite ends of a valve plug 83 that is slidable axially with the hollow body portion 80a. The end portions 83a and 83b of the plug 83 are adapted to be received in the bores 81c and 82c, respectively, with a loose sliding fit so that friction is minimized. The cooperating elements need not be manufactured to close tolerances as only a partial seal between the bores 81c and 82c and the plug 83 is required. A complete seal is provided by means of the rubbery rings 84 that are mounted in the grooves 83c and 83d in the end portions 83a and 83b of the plug. The rings 84 function in the manner described above.

The overall length of the valve plug 83 is somewhat greater than, and the distance between the inner edges of the grooves 83c and 83d is substantially equal to the distance between the inner ends of the couplings 81 and 82 so that both of the couplings 81 and 82 cannot be in direct communication with the coupling 80b simultaneously.

The plug 83 is guided in the body portion 80a of the valve casing 80 by means of the flanges 83e and 83f. The flanges 83f and 83e are, as illustrated, slightly more than semi-circular in shape so that the plug 83 will be centered with respect to the seats 81c and 82c, but permit gas or liquid to flow from the couplings 81 and 82 to the coupling 80b. The flanges 83e and 83f also act to limit the axial movement of the plug 83 by engaging the ends of the couplings 81 and 82, respectively. The spacing between the flanges 83e and 83f is less than the distance between the inner ends of the couplings 81 and 82 so that the end portions 83a and 83b of the plug 83 can be displaced completely from engagement with their respective seats 81c or 82c.

Shuttle valves of the type described above are responsive to differential pressures, so that in a dual hydraulic-gas system, the valve will connect the gas pressure source to the hydraulic system automatically, if the source of liquid pressure is damaged or fails.

With devices of the type described above, the presence of the sealing rings will assure a tight seal under all conditions of operation and yet will permit such looseness of fit of the valve plug within the valve casing that the plug will move easily in response to differential pressures at opposite ends of the valve plug.

It will be understood, of course, that my valve construction is suitable for use in many other systems than those disclosed herein and, therefore, the form of the invention disclosed herein should be considered as illustrative and not as limiting the scope of the following claims.

I claim:

1. A fluid pressure responsive valve comprising a tubular valve housing having inlets at opposite ends, an outlet between its ends and spaced apart cylindrical valve seats of less diameter than the internal diameter of said valve housing between said seats, an elongated valve plug of greater length than the distance between said valve seats and smaller diameter than said internal diameter between said seats to provide a passage for fluid around said plug, said plug being slidable axially in said housing and having cylindrical end portions alternately receivable in and substantially fitting said valve seats, means forming annular grooves in said end portions, resilient rubbery rings in said grooves effecting sealing engagement with said end portions and said seats, and means on said valve plug engaging the interior of said housing for guiding said plug in said housing and limiting the extent of axial movement of said plug.

2. A fluid pressure-responsive valve comprising a tubular valve housing having inlets at opposite ends, an outlet between its ends and spaced apart cylindrical valve seats of less diameter than the internal diameter of said valve housing between said seats, an elongated valve plug of greater length than the distance between said valve seats slidable axially in said housing and having cylindrical end portions alternately receivable in and substantially fitting said valve seats, said valve plug having a smaller diameter than said internal diameter between said seats to provide a passage for fluid around said plug, means forming annular grooves in said end portions, said grooves being spaced apart axially of said plug a greater distance than the distance between said seats, resilient rubbery rings in said grooves for effecting sealing engagement with said end portions and said seats, semi-circular flanges projecting laterally from said valve plug and slidably engageable with said valve housing for guiding said valve plug in said housing and limiting movement thereof.

3. A fluid pressure-responsive valve comprising a tubular valve housing having inlets at opposite ends, an outlet between its ends and spaced apart cylindrical valve seats of less internal diameter than the internal diameter of said housing between said seats, an elongated cylindrical valve plug of greater length than the distance between said valve seats having cylindrical end portions receivable in said valve seats, laterally extending flanges on said valve plug between said end portions engageable with the interior of said housing, said flanges being formed to guide said valve plug in said housing and permit flow of fluid from said inlets to said outlet, means forming annular grooves in said end portions, said grooves being spaced apart axially of said plug a greater distance than the distance between said seats, and resilient rubbery rings in said grooves for effecting sealing engagement with said end portions and said seats.

BENJAMIN N. ASHTON.

REFERENCES CITED

The following references are of record in the file of this patent:

UNITED STATES PATENTS

| Number | Name | Date |
|---|---|---|
| Re. 17,022 | Wilson | July 3, 1928 |
| 314,836 | Harvey (A) | Mar. 31, 1885 |
| 331,789 | Harvey (B) | Dec. 8, 1885 |
| 394,475 | Dwyer | Dec. 11, 1888 |
| 1,163,370 | Ryan | Dec. 7, 1915 |
| 1,436,768 | Mackie | Nov. 28, 1922 |
| 1,764,193 | Bruehl | June 17, 1930 |
| 1,871,327 | Kuen | Aug. 9, 1932 |
| 1,917,936 | Hartman | July 1, 1933 |
| 2,115,383 | Christensen | Apr. 26, 1938 |
| 2,170,327 | Hillis | Aug. 22, 1939 |
| 2,206,957 | Hose | July 9, 1940 |
| 2,358,228 | Hoof | Sept. 12, 1944 |
| 2,360,839 | Barksdale | Oct. 24, 1944 |

FOREIGN PATENTS

| Number | Country | Date |
|---|---|---|
| 40,549 | Germany | 1887 |
| 3,750 | Great Britain | Feb. 21, 1895 |
| 349,520 | Great Britain | May 27, 1931 |